(12) United States Patent
Ibbotson

(10) Patent No.: US 12,276,096 B2
(45) Date of Patent: Apr. 15, 2025

(54) PROTECTOR FOR A DRAIN

(71) Applicant: MANVERS ENGINEERING LIMITED, Barnsley (GB)

(72) Inventor: Christopher Ibbotson, Barnsley (GB)

(73) Assignee: MANVERS ENGINEERING LIMITED, Barnsley (GB)

( * ) Notice: Subject to any disclaimer, the term of this patent is extended or adjusted under 35 U.S.C. 154(b) by 21 days.

(21) Appl. No.: 17/766,851

(22) PCT Filed: Oct. 7, 2020

(86) PCT No.: PCT/EP2020/078189
§ 371 (c)(1),
(2) Date: Apr. 6, 2022

(87) PCT Pub. No.: WO2021/069532
PCT Pub. Date: Apr. 15, 2021

(65) Prior Publication Data
US 2023/0272605 A1    Aug. 31, 2023

(30) Foreign Application Priority Data

Oct. 7, 2019  (GB) ..................................... 1914422
May 4, 2020  (GB) ..................................... 2006586

(51) Int. Cl.
*E03C 1/264*   (2006.01)
*B01D 29/05*   (2006.01)
(Continued)

(52) U.S. Cl.
CPC .............. *E03C 1/264* (2013.01); *B01D 29/05* (2013.01); *B01D 39/086* (2013.01);
(Continued)

(58) Field of Classification Search
CPC ........ E03C 1/264; E03F 5/0404; B01D 29/05; B01D 29/055; B01D 39/086; B01D 39/1676; B01D 39/1692
See application file for complete search history.

(56) References Cited

U.S. PATENT DOCUMENTS 3,788,485 A     1/1974  Bruning
5,376,264 A  *  12/1994  Betancourt ............ B01D 29/01
                                                    210/166
(Continued)

FOREIGN PATENT DOCUMENTS

CN       104321121 A    1/2015
SE         508640 C2   10/1998

OTHER PUBLICATIONS

International Searching Authority, International Search Report and Written Opinion for International Application No. PCT/EP2020/078189, dated Jan. 29, 2021, (13 pages), European Patent Office, Rijswijk, Netherlands.

*Primary Examiner* — Janie M Loeppke
(74) *Attorney, Agent, or Firm* — Alston & Bird LLP

(57) ABSTRACT

A drain protector (1) is provided which has a conformable bottom frame (3) having a central opening that is closed by a filter element (4) spanning the opening. The filter element is capable of removing silt from water on a building site. The bottom frame is capable of conforming to the surface terrain around a drain opening due to the compressive weight of the drain protector in-situ. There is a porous top frame (2) that provides additional separation for debris from silted water and also provides compression weight for the bottom frame. The drain protector (1) may be removed, cleaned and reused.

19 Claims, 2 Drawing Sheets

(51) Int. Cl.
  *B01D 39/08* (2006.01)
  *B01D 39/16* (2006.01)
(52) U.S. Cl.
  CPC ....... *B01D 39/163* (2013.01); *B01D 39/1676* (2013.01); *B01D 39/1692* (2013.01); *B01D 2239/0622* (2013.01)

(56) References Cited

U.S. PATENT DOCUMENTS

| | | |
|---|---|---|
| 10,407,891 B1* | 9/2019 | Sanguinetti .......... E03F 5/0404 |
| 10,464,000 B2 | 11/2019 | Pourdeyhimi |
| 2006/0273002 A1 | 12/2006 | Maymudes |
| 2008/0230469 A1* | 9/2008 | Cherveny ............... E03C 1/264 |
| | | 210/455 |
| 2009/0101591 A1* | 4/2009 | Lewis ................... E03F 5/0404 |
| | | 210/163 |
| 2013/0292317 A1* | 11/2013 | Shaw ................... E03F 5/0404 |
| | | 210/283 |
| 2014/0007336 A1 | 1/2014 | Mills et al. |
| 2014/0014573 A1 | 1/2014 | Hosoya et al. |
| 2014/0075663 A1 | 3/2014 | Irwin et al. |
| 2014/0332476 A1 | 11/2014 | Pourdeyhimi |
| 2017/0058504 A1* | 3/2017 | Wilkie ................... C02F 1/004 |
| 2018/0106025 A1* | 4/2018 | Schuster ................ E03C 1/262 |
| 2020/0122069 A1 | 4/2020 | Pourdeyhimi |
| 2020/0370287 A1 | 11/2020 | West |

* cited by examiner

US 12,276,096 B2

PROTECTOR FOR A DRAIN

CROSS REFERENCE TO RELATED APPLICATIONS

This application is a National Stage Application, filed under 35 U.S.C. § 371, of International Application No. PCT/EP2020/078189, filed Oct. 7, 2020, which international application claims priority to and the benefit of: United Kingdom Application No. 1914422.9, filed Oct. 7, 2019, and United Kingdom Application No. 2006586.8, filed May 4, 2020; the contents of all of which as are hereby incorporated by reference in their entireties.

BACKGROUND

Related Field

The present invention relates to devices for preventing silt, other debris and contaminants from entering and collecting in water drainage systems and in particular to a device that fits over and encloses a drain inlet so as to trap and prevent silt and other debris from being washed into or being otherwise deposited within the drainage system, while enabling the free flow of water into the drainage system.

DESCRIPTION OF RELATED ART

In areas of new building works such as the construction of new housing, offices or infrastructure it is common for drainage systems to either be installed prior to any building and construction work or to be retained if for example a brown field location is to be developed. Once the drainage systems are in situ they are prone to damage or contamination during the subsequent constructions phases of any development. It is a serious challenge to keep these drainage systems free of dirt and debris during the development phase. As a functioning drainage system any water on site or any rainfall will travel to and into the drainage system. Of particular concern on a building site is fine silt, which may easily be transported to the inlets of the drainage system by rainfall and which may then be deposited and accumulate in the subterranean drainage system; this is difficult, time consuming and costly to remove. Removal or avoidance of this silt deposition my be a regulatory requirement in many jurisdictions.

There have been numerous attempts in the art to address this problem. Some approaches have used devices that are located below the drain inlet level and within the subterranean system to catch silt and debris as it is washed into the drain. One example is the Witches Hat Drain Guard made of geotextile fabric. Whilst being a low-cost solution it is difficult to use consistently, is problematic to extract safely from a drain when full of silt and debris and is difficult to reuse. Other solutions in the art have used crude filters usually based on a fine mesh on a frame located above the drain surface and secured to that surface using adhesive pads or mechanical devices. These solutions are not totally satisfactory as they are prone to damage are not easy to replace and reuse. A further solution requires the complete sealing of the drain inlet. Whilst protecting the subterranean drainage system from silt ingress this solution is not practical as rain and storm runoff water must be permitted to pass to and drain through the drainage system of the development during construction work so as to prevent water accumulation on site, which may be problematic and cause other damage on the site. An increasingly difficult problem to address is that the runoff water from building sites may be contaminated with low levels of machinery oil or other chemicals and it is highly desirable to prevent these contaminants from entering the drainage systems; in some jurisdictions environmental regulations prohibit or limit the levels of such contaminants.

Accordingly, it can be seen that a need exists for a device to cover and protect open drainage systems especially under building site conditions, but which still allows for the free and substantially complete drainage of runoff water into the drainage system at the development site.

BRIEF SUMMARY

The present invention generally comprises a temporary, substantially flexible and reusable drain protector. The present invention generally is designed for use at construction sites for enclosing the open drainage inlets of the water drainage system of the development during the construction of the development.

The present invention provides a drain protector comprising a conformable bottom frame having a central opening that is closed by a filter element spanning the opening that allows water to pass through the frame opening and into the drain whilst retaining silt and debris from the water, the bottom frame being capable of conforming to the surface terrain around a drain opening.

The bottom frame is preferably substantially planar and flat and is in the form of a ring of material with a central opening. The ring of material may be of any suitable shape depending on the shape of the drain to be protected. The frame opening that is generally of a dimension that conforms to the dimensions of the drain opening. The bottom frame is the component of the drain protector that makes contact with the terrain surrounding the drain opening when the drain protector is in use.

The bottom frame comprises material that may conform to the surface topography of the terrain surrounding the drain opening. Such terrain is generally flat but may have significant undulations and other non-planar features. The ability of the bottom frame to conform to this terrain ensures that any water with or without contaminants that travels to the drain must pass over rather than under the bottom frame in order to access the drain opening when the drain protector is in-situ.

Thus, the bottom frame material is generally compressible or deformable so that it will conform during use when under load. The required load to ensure adequate levels of conformation will be provided by the inherent weight of the drain protector forcing compression or deformation of the bottom frame during use.

In one embodiment the bottom frame material comprises a low-density foam material, such as for example a memory foam material. It may comprise an EPDM material in the form of a sponge which isn't as soft as a typical memory foam. The material used for the bottom frame is preferably non-porous to ensure that no water with or without debris may pass through the bottom fame material during use. Preferably, the material of the bottom frame is a closed cell foam material, or it may be an open celled foam with a sealed outer surface. The material of the bottom frame may be a compressible rubber or similar material.

In a further embodiment the bottom frame material comprises a nonwoven material. The nonwoven material I selected to provide enough compression or deformation to accommodate the topography of the terrain surrounding the drain opening. The nonwoven material may be hydrophilic or hydrophobic. It may be manufactured from polyester and/or polyolefin polymer fibres and in particular polypropylene. It is preferably of relatively low density so that it may conform to the non-uniform terrain around a drain opening. Therefore, nonwovens that are soft and flossy in form are suitable, providing a good balance between compressibility/deformability and robustness. Typically, they will be 400 gms or less, preferably 350 gsm or less and most preferable about 300 gsm. Ideally the nonwoven layer will be less than 15 mm in thickness. Preferably less than 10 mm in thickness and typically form 3 to 10 mm in thickness. The nonwoven will have a porosity that is such that when it is hydrophilic water may pass through the nonwoven layer and into the drain opening. The porosity of the nonwoven layer is such thar it offers a tortuous path to from the exterior of the drain protector to the drain opening. This reduces the flow of water through the non-woven layer and assists with ensuring that and low particle size suspended material is filtered from the water passing through this non-woven material. Preferably the exterior surface of this non-woven is such that its porosity prevents larger debris material from entering the non-woven layer. In addition, a hydrophilic material has the added advantage of being saturated with water during rainfall; this will add weight to the non-woven layer and will assist in retaining the drain protector in the correct location during rainfall. When the non-woven is hydrophobic the bottom frame is in effect non-porous as no water with or without debris may pass through the bottom fame material during use. The non-woven bottom frame may also be an dis preferably capable of removing organic or hydrocarbon contaminants such as oil or fuel from water that passes through the bottom frame of the drain protector and into the drain.

The filter element spans the opening of the bottom frame and may be secured to the material of the bottom frame via adhesive or thermal bonding. The filter element may comprise one or more functional elements. This filter element as a minimum comprises a material layer that may act as a silt filter, removing any silt from rainwater on the building site that is transported to the drain protector. This silt filter element is preferably in sheet form and preferably is a woven mesh material that is fine enough to retain silt from a building site but allows water to pass therethrough. It is preferably a hydrophilic material or a material of low oleophilic nature. The preferred silt filter element is a woven mesh, preferably having apertures of from 20 to 150 micron, more preferably 50 to 150 micron, more preferably 70 to 150 micron, and most preferably 70 to 125 micron. A preferred aperture is approximately 100 micron. The aperture is selected to adequately remove building site silt from rainwater and may be building side dependent. Preferably the silt filter element is a monofilament nylon mesh, with aperture of 100 micron, other materials with similar properties may be used.

A further function element of the filter element is a material layer that is capable of removing organic or hydrocarbon contaminants such as oil or fuel from water that passes through the drain protector and into the drain. These low levels of contamination may be derived from vehicles or machinery being used on the development site. Any suitable sheet form porous material may be used to provide this function. The contaminant filter element is used in combination with the silt filter element and is generally located below the silt filter element in the drain protector. It may be bonded with the silt filter element to the bottom frame and may be bonded with the silt filter element. The preferred materials for the contaminant filter element are oleophilic materials in the form of a woven or non-woven sheet. This porous layer may comprise woven and/or non-woven materials and preferably comprise non-woven materials. Preferably this layer is a non-woven fibrous layer that is primarily oleophilic in nature but is hydrophobic and porous enough so that water with or without hydrocarbon contamination may pass therethrough. Thus, the porous non-woven layer material incorporated into this filter element may be broadly defined as sheet or web structures bonded together by entangling fiber or filaments (and by perforating films) mechanically, thermally or chemically. They are flat or tufted porous sheets that are made directly from separate fibers, molten plastic or plastic film. They are not made by weaving or knitting and do not require converting the fibers to yarn.

These porous nonwovens are typically manufactured by putting small fibers together in the form of a sheet or web and then binding them either mechanically (as in the case of felt, by interlocking them with serrated needles such that the inter-fiber friction results in a stronger fabric), via adhesive, or thermally often with use of a binder material. Examples of suitable non-woven materials include staple nonwovens, melt-blown nonwovens, spun laid nonwovens, flash spun, spun jet, air-laid, wet-laid and other well-known forms. In many of these forms the laid fibre requires further treatment in the form of bonding of fibres to provide physical integrity to the nonwoven layer. Several bonding methods may be used and include be used: thermal bonding, hydro-entanglement, ultrasonic pattern bonding, needle punching/needle felting, chemical bonding with binders and melt-blown, where fiber is bonded as air attenuated fibers intertangle with themselves during simultaneous fiber and web formation.

One suitable nonwoven is a polypropylene based felt material typically used in the manufacture of oil/hydrocarbon absorbing pads or matts and preferably is 4 denier polypropylene fiber in a nonwoven layer and most preferably is less than 4 denier and most preferably is 3 denier. One preferred nonwoven material for one or more of the layers is a spun bond felt. Preferably, this felt layer is between 1-10 mm in thickness, most preferably 2 to 8 mm in thickness and most preferably 2 to 4 mm in thickness and most preferably comprises nonwoven felt material of density from 100 to 400 $g/m^2$, more preferably 150 to 300 $g/m^2$, more preferably 200 to 300 $g/m^2$, and most preferably 225 to 300 $g/m^2$.

The most preferred non-woven is a polypropylene non-woven hydrophilic layer of 3 denier and 400 gsm.

The filter element may also comprise a third component. This filter component is a top layer to the filter element, and this may be a hard-wearing open mesh that protects the underlying finer silt mesh.

Thus, in a preferred embodiment the drain protector comprises a filter element comprising a bottom layer of contaminant absorber, a middle layer of silt mesh and a protective top layer of hard-wearing open mesh material.

The filter element is preferably secured at its periphery, within the drain protector by bonding to the bottom frame and preferably between the bottom frame and a top frame.

It is preferred that the drain protector further comprises a top frame that provides additional function to the drain protector. If the drain protector does not have sufficient weight to compress or deform the bottom frame the top frame may provide some or all of the weight within the drain protector to compress or deform the bottom frame so that it conforms to the relent terrain surface. Preferably, the material of the top frame is of high density and is present in sufficient quantity to compress or deform the bottom frame.

The top frame preferably conforms to the shape of the bottom frame so that all of its weight is located over and impacting the material of the bottom frame.

The top frame may be a thin but dense material of sufficient weight to compress the bottom frame. This may for example be a metal frame or high-density rubber frame, both relatively thick and allowing water with or without silt and debris to pass over the top of the drain protector and onto the top of the filter element. In this arrangement all of the silt and larger debris accumulates on the top surface of the filter element and drain protector.

Alternatively, and preferably the top frame is relatively thick and porous, whilst still being of sufficient weight to compress the bottom frame. In this arrangement the top frame is upstanding from the top of the filter element and provides a barrier to the free flow of water with or without debris and silt over the top frame and onto the filter element. This water on reaching the periphery of the top frame must pass through the material of the top frame and onto the top of the filter element. The material of the top frame is sufficiently porous to allow the water to carry silt through it and onto the filter element, whilst retaining larger items of debris at the periphery of the top frame and away from the top of the filter element. This top frame construction thus has the benefit of segregating large debris items from silt during use.

The top surface of the top frame may be sealed so as to provide a non-porous top surface, whilst maintain the porosity of the bulk of the top frame material. This ensures that the top frame has greater integrity during use, and this also prevents ingress of materials e.g. mud or other materials from the building site through the top surface of the top frame during use, such ingress could block the transport of water through the top frame material.

The top frame is preferably compressible, but to a much lower degree than the bottom frame. It is preferred that the top frame comprising rubber crumb and preferably rubber crumb from recycled tyre rubber. This crumb material may be adhesively bonded or thermally bonded to provide a highly porous but robust top frame material. The top frame material may however be any suitable material to provide a porous top frame with the required weight to compress the bottom frame during use.

The top frame may also comprise materials that assist in indicating the presence and location of the drain protector on a building site. Such materials may be luminescent materials or highly coloured rubber particles that have been used with the core rubber (usually black tyre rubber) to form the top frame.

In use, a drain protector according to the present invention is placed over the drain to be protected. The opening in the base of the bottom frame is of the same shape and size as the drain and is easily aligned over the drain. Due to the weight of the drain protector the bottom frame material is compressed on to the surface terrain around the drain and effectively seals the drain protector to the terrain surface so that any water with or without debris and or silt must pass over and/or through the side wall of the top frame in order to access the filter element before entering the drain. The weight of the drain protector is typically greater than 4 Kg and this is enough to ensure that it is retained in position over the drain. The compressed bottom frame also assists in rendering the drain protector immobile as it grips or grabs the terrain surface when under compression. Any large items of debris that accumulate around the drain protector may easily be removed as and when desired. The water with or without silt easily passes through the porous top frame and any silt is retained by the silt element of the filter as water passed through the filter element and into the drain. If the water is mildly contaminated with oil or hydrocarbons these are removed by the contamination filter as the water passes from the silt element to this filter. The waste finally passes from the drain protector and into the drain, which is protected from silt and debris ingress. Periodically, as the filter element accumulates silt the whole of the drain protector may be removed to enable cleaning of the drain protector to remove the accumulated silt. As the drain protector is removed from the drain the bottom frame material recovers from the compressed state and is ready for reuse of the drain protector. Once cleaned the drain protector may easily be realigned with the drain for further continued protection of the drain. As the drain protector of the present invention is substantially flat, planar and rugged it will withstand vehicles and machinery passing over it in-sit, without resulting in any damage or reduction in function. When the top surface of the top frame has been sealed the drain protector is not contaminated with mud from vehicular wheels as they pass over the drain protector. Ideally, this will be avoided when the drain protector is coloured, easily observable and avoidable.

Various objects, features and advantages of the present invention will become apparent to those skilled in the art upon reading the following detailed description, when taken in conjunction with the accompanying drawings.

DETAILED DESCRIPTION OF VARIOUS EMBODIMENTS

Figure 1:
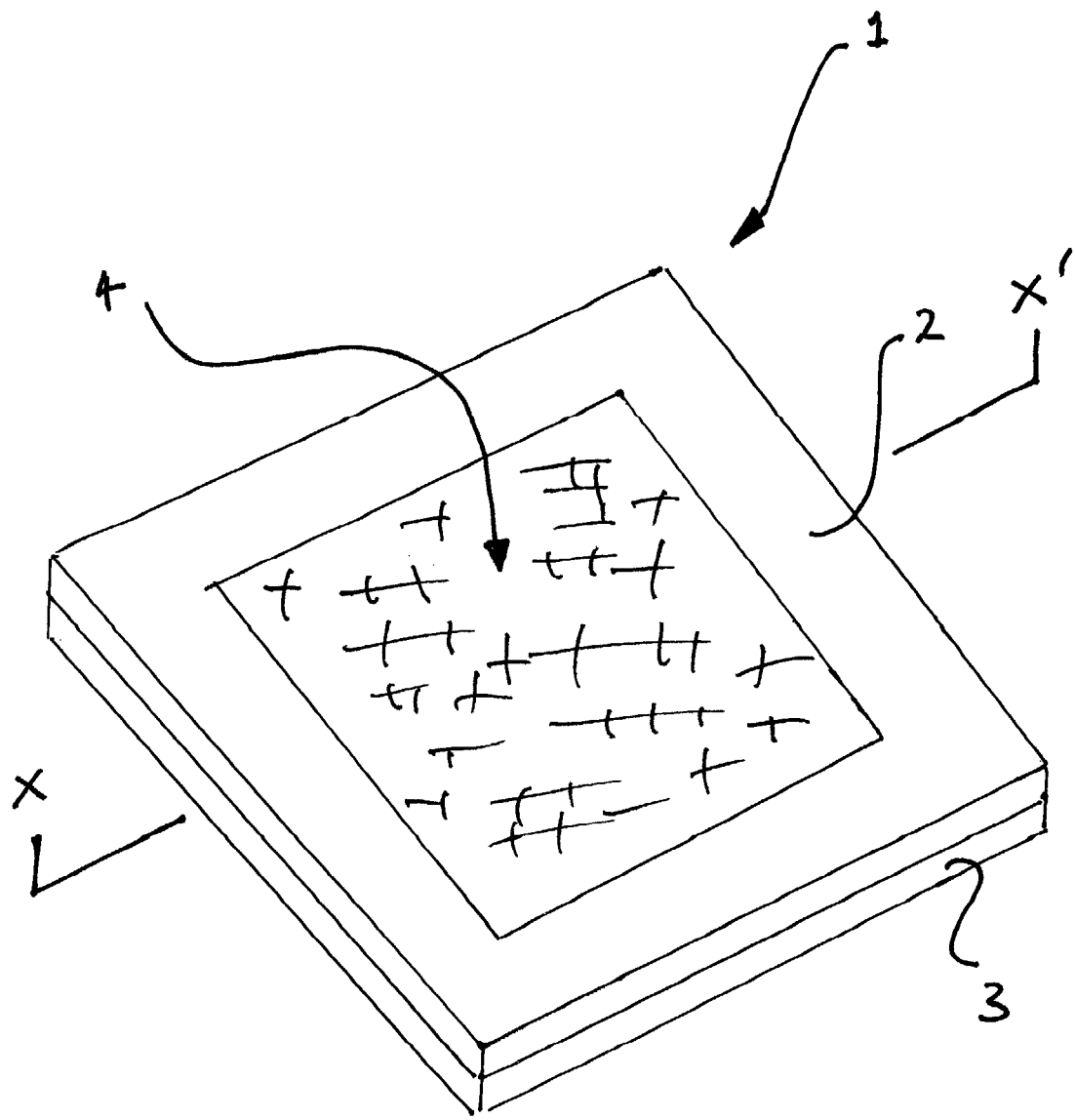
FIG. 1 is a schematic perspective view of a drain protector according to the present invention.

Referring now to the drawings, in which like reference numerals indicate like parts throughout, FIG. 1 illustrates the drain protector (1), which has a top frame (2) and a bottom frame (3), both of which have a drain proportion opening of similar dimensions. These two frames (2, 3) are aligned and bonded to each other. Spanning the openings of the top (2) and bottom frames (3) is a filter element (4), which is bonded at its periphery between the top (2) and bottom frames (3). The top frame (2) is made of bonder tyre rubber crumb and the bottom frame (3) is made of compressible memory foam.

Figure 2:
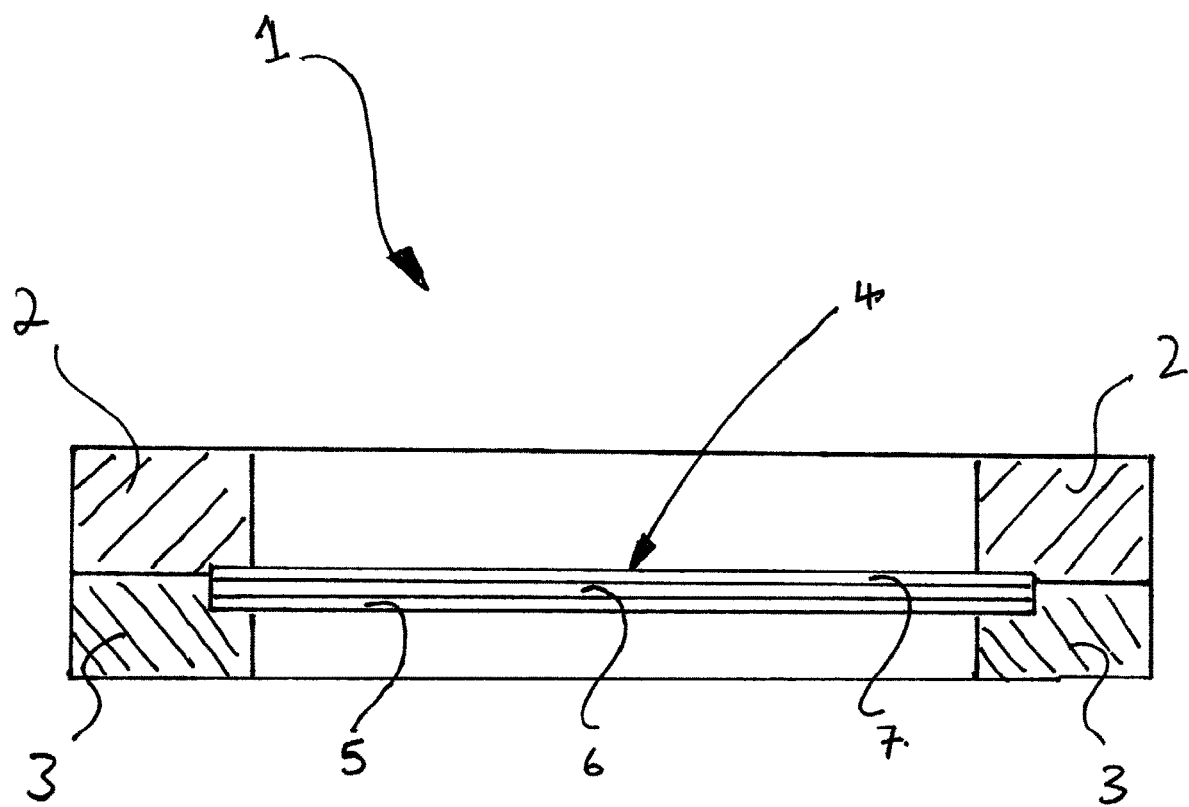
FIG. 2 is a sectional view along the axis x-x' of FIG. 1.

In FIG. 2, the filter element (4) can be more clearly seen and its individual components. This element (4) is made up of three components. The bottom component (5) is a contaminant filter made of oleophilic polypropylene non-woven material. The middle component (6) is a silt filter element, which is made of monofilament nylon mesh with 100-micron aperture. The top component (7) is made of and open mesh of polymeric material, which protects the underlying silt filter (6).

It will be understood by those skilled in the art that while the present invention has been described in terms of a preferred embodiment thereof, numerous modifications, additions and changes can be made thereto without departing from the spirit and scope of the invention as set forth in the following claims.

The invention claimed is:

1. A drain protector comprising:
a conformable bottom frame having a central opening;
a porous top frame having a central opening; and a silt filter element located between the conformable bottom frame and the porous top frame, wherein:

the porous top frame is a material sufficiently porous to allow water to pass through its bulk, and to carry silt through its bulk and onto the silt filter element, the porous top frame has sufficient weight to compress the conformable bottom frame during use of the drain protector, and the conformable bottom frame is capable of conforming, under the weight of the porous top frame, to the surface terrain around a drain opening during use of the drain protector and in the conformed state grabbing the surface terrain rendering the drain protector immobile.

2. The drain protector of claim 1, wherein the conformable bottom frame is substantially planar and flat and is in the form of a ring of material with the central opening.

3. The drain protector of claim 1, wherein the conformable bottom frame material comprises a low-density foam material.

4. The drain protector of claim 3, wherein the conformable bottom frame material comprises a memory foam material.

5. The drain protector of claim 3, wherein the conformable bottom frame material comprises an EPDM material in the form of a sponge.

6. The drain protector of claim 1, wherein the conformable bottom frame material comprises a non-woven material.

7. The drain protector of claim 1, wherein the silt filter element comprises two or more functional elements.

8. The drain protector of claim 7, wherein the silt filter element comprises a contaminant filter element.

9. The drain protector of claim 8, wherein the contaminant filter element comprises a polypropylene non-woven hydrophilic layer of 3 denier and 400 gsm.

10. The drain protector of claim 7, wherein the silt filter element comprises an open mesh protection element.

11. The drain protector of claim 1, wherein the silt filter element is a woven mesh having apertures.

12. The drain protector of claim 11, wherein the apertures are sized from 20 to 150 micron.

13. The drain protector of claim 11, wherein the apertures are sized from 50 to 150 micron.

14. The drain protector of claim 11, wherein the apertures are sized from 70 to 150 micron.

15. The drain protector of claim 1, wherein the porous top frame is aligned with the conformable bottom frame.

16. The drain protector of claim 1, wherein the porous top frame comprises high density rubber.

17. The drain protector of claim 1, wherein the porous top frame comprises rubber crumb.

18. The drain protector of claim 17, wherein the rubber crumb is from recycled tire rubber.

19. The drain protector of claim 1, wherein the material of the porous top frame comprises materials that assist in indicating the presence and location of the drain protector on a building site.

* * * * *